United States Patent [19]

Pritchard et al.

[11] Patent Number: 5,351,781
[45] Date of Patent: Oct. 4, 1994

[54] BULLDOG VEHICLE ANTI-THEFT SYSTEM

[76] Inventors: Chalmers A. Pritchard, Rt. 5, Box 2505, Tallahassee, Fla. 32311; John B. Whitman, Rt. 3, Box 5300, Crawfordville, Fla. 32327

[21] Appl. No.: 82,796

[22] Filed: Jun. 28, 1993

[51] Int. Cl.$^5$ .............................. B60R 25/00
[52] U.S. Cl. .................... 180/287; 188/353; 303/89
[58] Field of Search .......... 180/287; 303/89; 188/353, 265; 307/10.2; 70/237, 256, 277

[56] References Cited

U.S. PATENT DOCUMENTS

| | | | |
|---|---|---|---|
| 3,617,663 | 11/1971 | Whittemore | 188/353 |
| 4,495,910 | 1/1985 | Taylor | 180/287 |
| 4,678,068 | 7/1987 | Matthews et al. | 303/87 |
| 4,721,192 | 1/1988 | Cano et al. | 180/287 |
| 4,951,776 | 8/1990 | Jeter | 180/287 |
| 4,964,677 | 10/1990 | Splinter | 303/89 |
| 5,163,741 | 11/1992 | Hsiu | 188/353 |

FOREIGN PATENT DOCUMENTS

| | | | |
|---|---|---|---|
| 0484715 | 7/1952 | Canada | 188/353 |
| 2195005 | 3/1988 | United Kingdom | 303/89 |

Primary Examiner—Margaret A. Focarino
Assistant Examiner—Christopher P. Ellis
Attorney, Agent, or Firm—Carnes, Cona & Dixon

[57] ABSTRACT

The present invention relates to a vehicle anti-theft system which, when activated, will block the vehicle's hydraulic brakes into the locked position preventing the vehicle from being driven or towed. Once activated, the system is immune to power failure. The system can use one of several control means to activate the system including keypad, scanners, key system, or wireless remote.

18 Claims, 3 Drawing Sheets

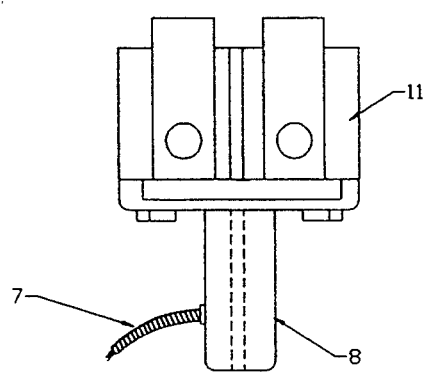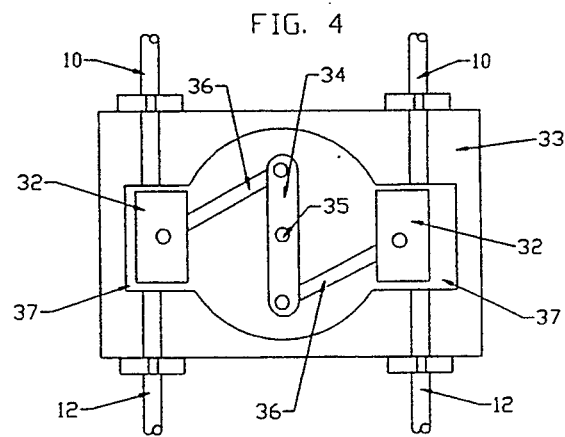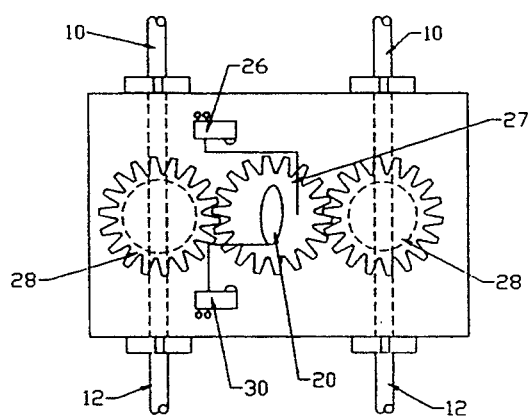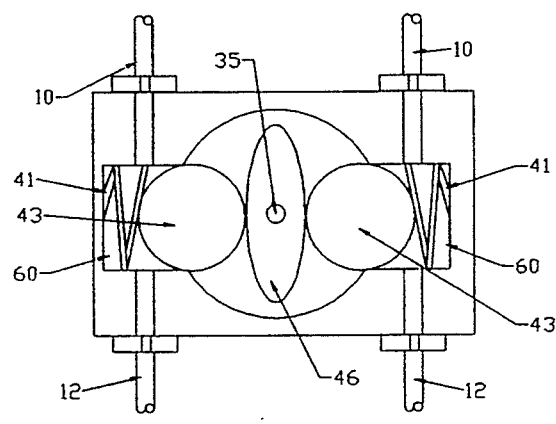

, 781

BULLDOG VEHICLE ANTI-THEFT SYSTEM

BACKGROUND OF THE INVENTION

Auto theft is a problem in the United States reaching epidemic proportions. Auto theft costs the American public countless dollars in damages. Vehicles are stolen and shipped off to remote destinations to be resold or taken to "chop shops" to be striped to their parts and then the parts are resold. Other vehicles are stolen by thrill seekers to be used for joy riding and thereafter the vehicle set ablaze or otherwise severely damaged to destroy any evidence of the identity of the thief.

Many anti-theft devices have been conceived in order to combat this serious problem. However, none of the inventions conceived to date have the particular combination of features as the Bulldog anti-theft system.

Many common inventions make use of sensors to detect either door openings or car vibrations. Upon detection of an adverse event, these inventions attract attention to the compromised vehicle by making noise such as sounding an alarm or the vehicle's horn, and flashing the lights of the vehicle. This noise being intended to frighten the would-be thief away.

Other inventions are designed to forcefully lock the steering mechanism into place thereby preventing the vehicle from being operative. These inventions, although having some effect, are easily by-passable by an enterprising thief.

Inventions which draw attention to the vehicle can be defeated simply by disconnecting the power source of the alarm by disconnecting the car's battery. Thereafter, the alarm can be disconnected or the horn disabled and the thief is free to reconnect the battery and pursue his craft.

The proliferation of false alarms has made the public largely immune to the noise generated from these alarms thereby permitting the thief to accomplish his task with minimal attention.

The steering disabling invention as well as the noise making invention are unable to prevent the vehicle from being towed away. A thief can simply arrive by tow truck, pick up his intended booty and haul it off rendering the above theft prevention inventions impotent.

The present invention overcomes the above short comings. The present invention is designed to set the vehicle's brakes into a locked position thereby making the vehicle impossible to drive or tow. The present invention can also be used in conjunction with the standard noise making inventions for added security.

Various braking locking inventions have already been proposed, for instance Baruch, U.S. Pat. No. 4,765,362. However the below-cited inventions suffer from one or both of two short comings. Many of the current brake locking inventions are of a complex design and require a substantial reworking of the vehicle's hydraulic brake system to install.

Other inventions can be compromised by simply disconnecting the vehicle's power source. These inventions are designed so that if power is lost during vehicle operation the brakes are automatically engaged creating an immense safety concern.

Therefore it is an object of the present invention to create a vehicle anti-theft system whereby the invention renders the vehicle non-operational and non-towable.

It is a further object of the present invention to create a vehicle anti-theft system which is relatively inexpensive to manufacture and install.

It is a further object of the present invention to create a vehicle anti-theft system that can only be disabled by authorized personnel and that will not engage the vehicle's brakes during a catastrophic power lost during normal vehicle operation.

BACKGROUND OF THE PRIOR ART

U.S. Pat. No. 4,873,824 issued to Cox discloses an anti-theft break locking mechanism installed between the master cylinder and the brake actuator and can be activated or deactivated from a key or combination mechanism located within the driver's compartment. The locking mechanism can be mechanical or electrical.

U.S. Pat. No. 4,765,362 issued to Baruch discloses an automotive anti-theft device with a rotating valve that locks the hydraulic cylinders. The anti-theft device is connected to and actuated by a key operated lock.

U.S. Pat. No. 4,777,377 issued to Jeter discloses an automotive anti-theft device that is actuated by a key switch or a magnetically encoded card and card reader. The system actuates a matching solenoid valve to a closed or open position corresponding to a vehicle disable or enable state.

U.S. Pat. No. 5,045,837 issued to Gosker discloses an anti-theft device utilizing a fuel cut-off valve that is controlled by a remote data entry key pad. The body of the valve and the electronic control circuitry are encased in a hard compound that prevents and discourages tampering with the valve and the electronic circuit.

U.S. Pat. No. 2,695,685 issued to Jamison discloses an electrohydraulic anti-theft device that locks the hydraulic cylinders. The valve has an electromagnetic actuator coupled to the generator to become instantly available to close the valves when the car is started. The switch mechanism can be electronic or mechanical and be placed in a hidden position.

U.S. Pat. No. 3,800,279 issued to Thompson discloses an automotive anti-theft system having a key operated lock that actuates a valve to a blocking position between the main master cylinder and the brake line leading to the wheel cylinders. The system also has a feature that prevents the unauthorized towing of the vehicles by activating an alarm circuit that sounds an audio device such as the vehicle's horn or a separate audio alarm.

BRIEF SUMMARY OF THE INVENTION

The present invention comprises a housing unit, a driving means, and a control means.

The housing unit is installed between the vehicle's master cylinder and the proportioning valve. The vehicle's brake hydraulic fluid enters from the master cylinder, passes through the housing unit and exits into the proportioning valve.

In order to activate the system, the operator depresses the brake pedal of the vehicle. This causes an increase in the hydraulic pressure throughout the brake lines. The invention is then activated, which causes blocking means to close the fluid channel of the invention causing a blockage of brake fluid and preventing the fluid from returning to the master cylinder. As a result of this brake fluid blockage, the fluid in the brake lines remains pressurized even after the operator releases the brake pedal.

When the operator deactivates the system, the blocking means open the fluid channel of the invention releasing the blockage of brake fluid and permitting the fluid to return to the master cylinder. As a result, the fluid in the brake lines is depressurized and the brakes are released into their normal operating state.

In one embodiment of the invention the blocking means consist of a gear operated cylinder shut-off.

In another embodiment of the invention the blocking means consist of a rod and piston assembly.

In yet another embodiment of the invention the blocking means consist of a cam and hydraulic ball assembly.

BRIEF DESCRIPTION OF THE DRAWINGS

For a fuller understanding of the nature and objects of the invention, reference should be had to the following detailed description taken in connection with the accompanying drawings in which:

FIG. 2 shows a top level view of the blocking means and 12 volt direct current motor.

FIG. 3 shows the inside cross-sectional view of the gear assembly embodiment.

FIG. 4 shows inside cross-sectional view of the piston embodiment of the invention.

FIG. 5 shows inside cross-sectional view of the hydraulic ball embodiment of the invention.

DETAILED DESCRIPTION OF THE PREFERRED EMBODIMENT

Figure 1:
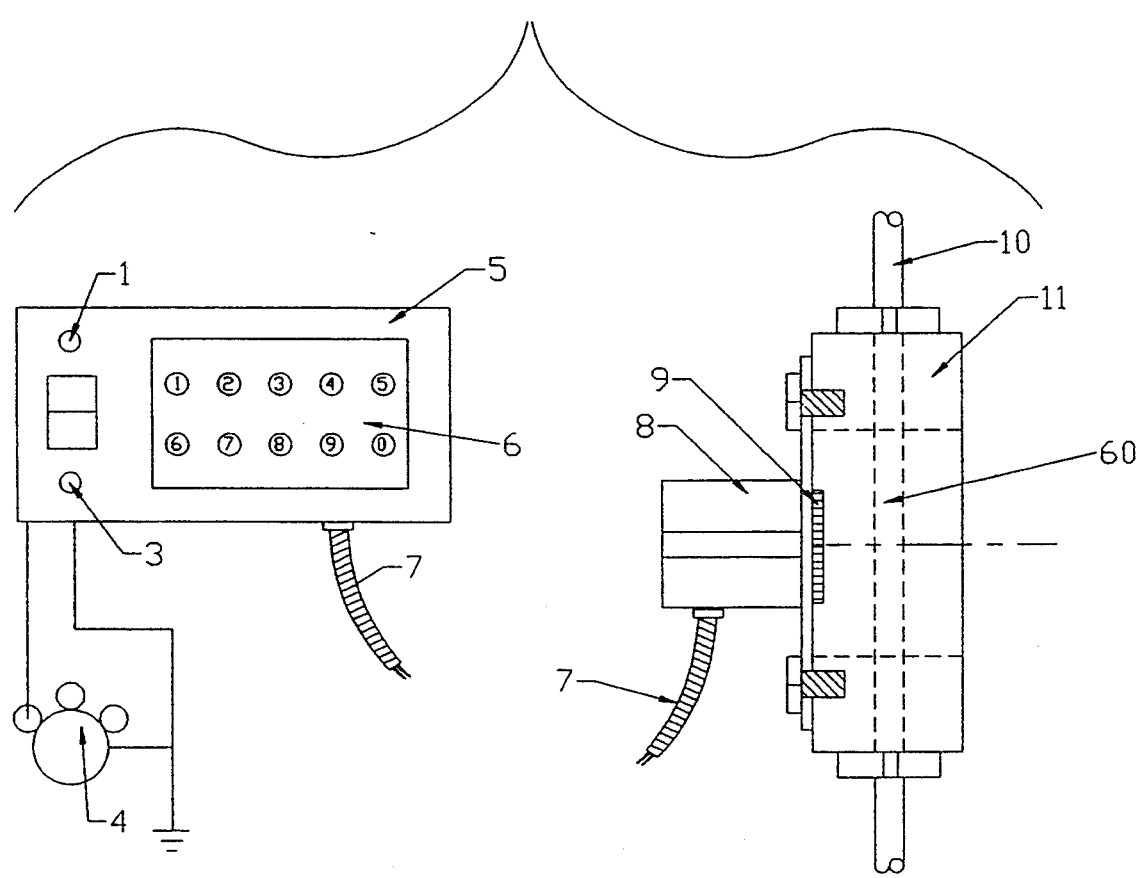
FIG. 1 shows an overview of the system including the control means, consisting of the alpha-numeric keypad embodiment, and blocking means.
Figure 6A:
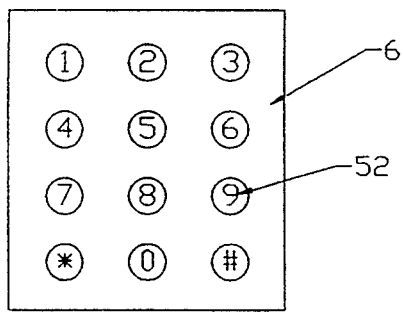
FIG. 6 shows the various embodiments of the control mechanisms for the invention, including the numeric keypad, the key and cylinder, the magnetic reader, the thumb or retinal identification reader, and the wireless remote embodiments.
Figure 6D:
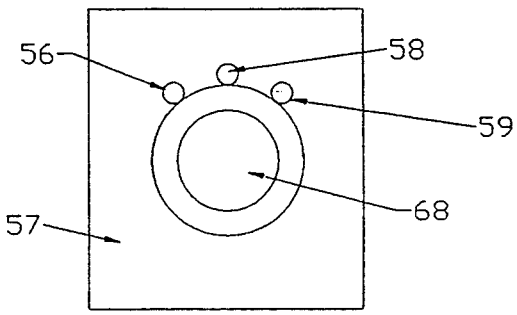
Figure 6B:
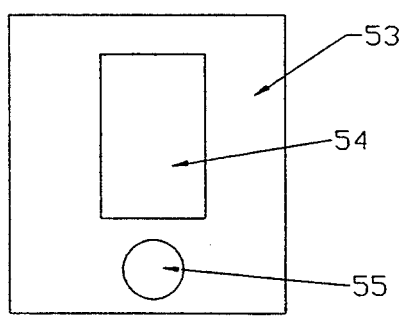
Figure 6E:
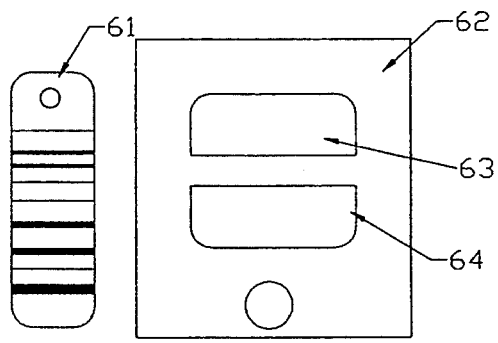
Figure 6C:
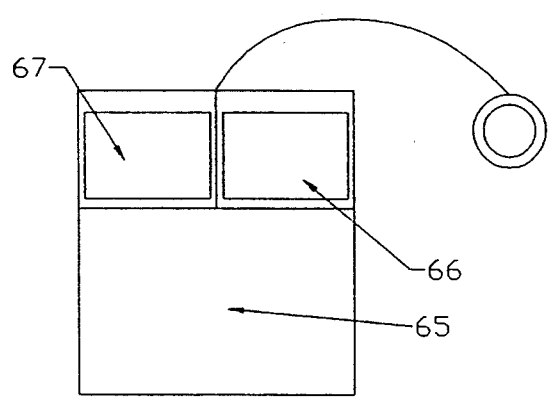

The present invention consists of a housing unit 11 as can be seen in FIG. 1. The housing unit 11 is located between the vehicle's brake master cylinder and proportioning valve (neither shown). The housing unit 11 is connected to the master cylinder by brake lines 10 and to the proportioning valve by brake lines 12.

The housing unit 11, within which are located fluid channels 60 and fluid blockage means 9. The fluid blockage means 9 block and unblock the flow of brake fluid through the fluid channel. 60.

Secured to the housing unit is a 12 volt direct current motor 8 of a well known type. Internally located within the motor 8 is a shaft (not shown) which shaft protrudes into the body of the housing unit 11 and is attached to the fluid blockage means 9.

Attached to the fluid blockage 9 means are a first cam actuated limit switch 26 and a second cam 20 actuated limit switch 30. Said limit switches are in electrical communication with the motor 8.

The motor 8 is connected by electrical conduits 7 to control means 5. The control means 5 is locatable within the vehicle compartment.

In order to activate the system an authorized person depress the brake pedal causing pressurization throughout the brakes' hydraulic lines, and the person will then arm the system through the control means 5. The control means 5 sends an activate signal through the electrical conduits 7 to the motor 8. The motor 8 will then activate an appropriate duration until a stop signal is communicated to the motor by the first limit switch 26, causing the shaft to turn in one direction. The shaft will thereby cause the fluid blockage means 9 within the housing unit 11 to block the flow of brake fluid through the fluid channel 60. This blockage of brake fluid will prevent the brake fluid from returning to the master cylinder and will maintain the pressurization of the brakes' hydraulic lines after the operator releases the brake pedal. The brakes will then remain in the locked position. The system will remain in this stable state irrespective of continuation of system electrical power.

In order to deactivate the system an authorized person will disarm the system through the control means 5. The control means 5 sends a deactivate signal through the electrical conduits 7 to the motor 8. The motor 8 will then activate an appropriate duration until a stop signal is communicated to the motor by the second limit switch 30. The deactivate signal sent by the control means 5 will be reverse polarity from the activate signal thereby causing the shaft to rotate in the reverse direction. The shaft will thereby cause the fluid blockage means 9 within the housing unit 11 to unblock the flow of brake fluid through the fluid channel 60 permitting the brake fluid to return to the master cylinder. This will cause depressurization on the brakes' hydraulic lines and will set the brakes into the unlocked position permitting normal brake operation. The system will remain in this stable state irrespective of continuation of system electrical power.

In one embodiment of the invention the fluid blockage means consists of a cross-bar 34 which is boltably attached to the top of said shaft 35. Boltably attached to both ends of cross-bar 34 are rods 36. Said rods are attached at their opposite end to pistons 32. Said pistons are in fluid communication with the brake fluid flowing through the fluid channel 60. When the shaft 35 rotates pursuant to an activate signal from the control means 5 the cross-bar 34 rotates an appropriate amount counter-clockwise, until the motor 8 receives a stop signal from the first limit switch 30. This causes the rod 36 and piston 32 assembly to be extended outwardly into the fluid channel 60 blocking the flow of fluid through the fluid channel 60.

When the shaft 35 rotates pursuant to a deactivate signal from the control means 5 the cross-bar 34 rotates an appropriate amount clockwise, until the motor 8 receives a stop signal from the second limit switch 30. This causes the rod 36 and piston 32 assembly to be retracted inwardly away from the fluid channel 60 unblocking the flow of fluid through the fluid channel 60.

In another embodiment of the present invention the fluid blockage means comprises a hydraulic ball assembly. Boltably attached to the top of shaft 35 is a smooth oval cam 46. The oval cam 46 is in contact with hydraulic balls 43 at the oval cam's 46 nadir edges. The hydraulic balls 43 are in fluid communication with the brake fluid flowing through the fluid channel 60. When the shaft 35 rotates pursuant to an activate signal from the control means 5 the oval cam 46 rotates an appropriate amount counter-clockwise, until the motor 8 receives a stop signal from the first limit switch 26 This causes the oval cam's 46 zenith edges to contact the hydraulic balls 43 causing said hydraulic balls to be extended outwardly into the fluid channel 60 blocking the flow of fluid through the fluid channel 60.

When the shaft 35 rotates pursuant to a deactivate signal from the control means 5 the shaft 35 rotates an appropriate amount clockwise, until the motor 8 receives a stop signal from the second limit switch 30.

This causes the oval cam to turn until its nadir edges are contactable with the hydraulic balls 43. The hydraulic balls are returned to contact the oval cam 46 by spring means 41. This inward return of the hydraulic balls 43 to the oval cam's 46 nadir edges causes the hydraulic balls to be retracted inwardly away from the fluid channel 60 unblocking the flow of fluid through the fluid channel 60.

In yet another embodiment of the present invention the fluid blockage means 9 comprises a gear assembly. Boltably attached to the top of shaft 35 is a main gear 27. Ratchetably attached to the main gear 27 are blockage gears 28. The blockage gears 28 have an internal hollow core through which core flows brake fluid. When the shaft 35 rotates pursuant to an activate signal from the control means 5 the main gear 27 rotates an appropriate amount clockwise, until the motor 8 receives a stop signal from the first limit switch 26. This causes the blockage gears 28 to rotate until the core is perpendicular to the original position. This rotation prevents fluid from flowing through the core.

When the shaft 35 rotates pursuant to a deactivate signal from the control means 5 the shaft 35 rotates an appropriate amount counter-clockwise, until the motor 8 receives a stop signal from the second limit switch 30. This causes the main gear 27 to rotate an appropriate amount. This causes the blockage gears 28 to turn until the core is returned to its original position. This rotation permits the flow of brake fluid through the core.

In one embodiment of the invention, the activation means consists of an alphanumeric keypad 6 locatable within the driver's compartment. The keypad is in electrical communication with said motor 8. Said keypad has two or more alphanumeric characters 52 and is programmable by the vehicle operator to store a certain combination of alphanumeric characters 52. Once so programmed the sequence is stored in memory until overridden by programming in a new sequence. In order to activate the system the operator must enter the precise character sequence. The system will check to see if the character combination entered matches the character combination in memory. If a match occurs, the keypad 6 will send an electrical signal to the motor 8 to start the motor 8.

In order to deactivate the system, the operator must once again enter the precise combination of characters, which will send a electrical signal to the motor 8 to start the motor 8.

In another embodiment of the invention, the activation means consists of a bar code scanner 62 or retinal or thumb print scanner 53. The scanner is programmable to scan either the operator's retina or thumb print through a scan window 54 or a specific bar code through another scan window 62 which bar code is locatable on a key chain. Once so scanned, the scanned image is retained in memory until overridden by scanning in a new image. In order to activate the system the operator must scan in the appropriate image. The system will check to see if the image scanned matches the image in memory. If a match occurs, the scanner 53 or 62 will send an electrical signal to the motor 8 to start the motor 8.

In order to deactivate the system, the operator must once again scan in the appropriate image, which will send a electrical signal to the motor 8 to start the motor 8. The retinal or thumb print scanner has an override button 55 and the bar code scanner 62 has an override button 64.

In another embodiment of the invention, the activation means consist of a key-lock system 57. In order to activate the system the operator inserts the appropriate key into the key cylinder 67 and turns to the on position 58 which will send an electrical signal to the motor 8 to start the motor 8. In order to deactivate the system the operator inserts the appropriate key into the key cylinder 67 and turns it to the off position 56 which will send an electrical signal to the motor 8 to start the motor 8. An override key position 59 is also available.

In another embodiment of the invention, the activation means consist of a wireless remote system. A signal box 65 is kept with the operator preferably on the operator's key chain. In order to activate the system the operator presses an activate button 66 on the signal box 65. This will send a radio signal to the system. The system, upon detection of the radio signal will send an electrical signal to the motor 8 to start the motor 8.

In order to deactivate the system the operator again presses the activate button 66 on the signal box 65. This will send a radio signal to the system. The system upon detection of the radio signal will send an electrical signal to the motor 8 to start the motor 8. An override button 67 is also available.

All of the above control means have an LED 1 to indicate a system enabled state and a second LED 3 to indicate a system disabled state.

All embodiments of the control means are electrically connected to the vehicle's ignition system 4. Turning on the ignition will complete an electrical circuit with the Bulldog invention.

The override buttons described above, permit the system to be bypassed by authorized personnel in case of system malfunction.

We claim:

1. A brake locking mechanism for use with a vehicle's hydraulic braking system with means for blocking and unlocking the flow of hydraulic fluid through the existing brake hydraulic system comprising:

a housing;
   said housing having an exterior and an interior;
   said housing having a first cavity within said interior, a second cavity within said interior, and a third cavity within said interior;
a first input channel, and a second input channel;
   said first input channel being in fluid communication with said first cavity and also in fluid communication with a master cylinder of said brake system;
   said second input channel being in fluid communication with said second cavity and also in fluid communication with said master cylinder of said brake system;
a first output channel, and a second output channel;
   said first output channel being in fluid communication with said first cavity and also in fluid communication with a proportioning valve of said brake system;
   said second output channel being in fluid communication with said second cavity and also in fluid communication with said proportioning valve of said brake system;
a direct current motor;
   said direct current motor has a shaft;
      said shaft rotates in response to operation of said direct current motor;
   said direct current motor being attached to said exterior;

said shaft protrudes into said third cavity;
a first limit switch, and a second switch;
  said first limit switch being in electrical communication with said direct current motor;
  said second limit switch being in electrical communication with said direct current motor;
a first gear, a second gear, and a third gear;
  said first gear has a first fluid channel;
  said first fluid channel, said first input channel and said first output channel being of substantially the same diameter;
  said first gear is located within said first cavity;
  said first fluid channel, said first input channel, and said first output channel are aligned when the brake locking mechanism is in an initial state;
  said second fluid channel, said second input channel and said second output channel being of substantially the same diameter;
  said second gear is located within said second cavity;
  said second fluid channel, said second input channel, and said second output channel are aligned when the brake locking mechanism is in an initial state;
  said third gear is attached to said shaft;
  said third gear is located within said third cavity;
  said third gear is in gearable communication with said first gear;
  said third gear is in gearable communication with said second gear;
a control means;
  said control means being in electrical communication with said direct current motor;
whereby said direct current motor is activated in response to receiving a predetermined signal from said control means and if the brake locking mechanism is in an initial state said direct current motor turns said third gear which in turn turns said first gear and said second gear until said first fluid channel is unaligned with said first input channel and said first output channel preventing fluid flow between said first input channel and said first output channel and said second fluid channel is unaligned with said second input channel and said second output channel preventing fluid flow between said second input channel and said second output channel wherein said direct current motor deactivates pursuant to a stop signal from said first limit switch rendering said brake locking mechanism into an armed state; and
whereby said direct current motor is activated in response to receiving a predetermined signal from said control means and if the brake locking mechanism is in an armed state said direct current motor turns said third gear which in turn turns said first gear and said second gear until said first fluid channel is aligned with said first input channel and said first output channel enabling fluid flow between said first input channel and said first output channel and said second fluid channel is aligned with said second input channel and said second output channel enabling fluid flow between said second input channel and said second output channel wherein said direct current motor deactivates pursuant to a stop signal from said second limit switch rendering said brake locking mechanism into an initial state.

2. The brake locking mechanism as in claim 1 wherein said control means comprises an alpha-numeric key pad.

3. The brake locking mechanism as in claim 1 wherein said control means comprises a lock and key system.

4. The brake locking mechanism as in claim 1 wherein said control means comprises a retina and thumb print scanner.

5. The brake locking mechanism as in claim 1 wherein said control means comprises a bar code scanner.

6. The brake locking mechanism as in claim 1 wherein said control means comprises a wireless remote signaling device.

7. A brake locking mechanism for use with a vehicle's hydraulic braking system with means for blocking and unlocking the flow of hydraulic fluid through the existing brake hydraulic system comprising:
a housing;
  said housing having an exterior and an interior;
  said housing having a first cavity within said interior, a second cavity within said interior, and a third cavity within said interior;
a first input channel, and a second input channel;
  said first input channel being in fluid communication with said first cavity and also in fluid communication with a master cylinder of said brake system;
  said second input channel being in fluid communication with said second cavity and also in fluid communication with said master cylinder of said brake system;
a first output channel, and a second output channel;
  said first output channel being in fluid communication with said first cavity and also in fluid communication with a proportioning valve of said brake system;
  said second output channel being in fluid communication with said second cavity and also in fluid communication with said proportioning valve of said brake system;
a direct current motor;
  said direct current motor has a shaft;
    said shaft rotates in response to operation of said direct current motor;
  said direct current motor being attached to said exterior;
  said shaft protrudes into said third cavity; a first limit switch, and a second switch;
  said first limit switch being in electrical communication with said direct current motor;
  said second limit switch being in electrical communication with said direct current motor;
a cross bar;
  said cross bar has a first end, a second end, and a middle,
  said cross bar being attached to said shaft at said middle;
a first rod, and a second rod;
  said first rod has a first side and a second side;
    said first side of said first rod being attached to said first end of said cross bar;
  said second rod has a first point and a second point;
    said first point of said second rod being attached to said second end of said cross bar;
a first piston, and a second piston;
  said second side of said first rod being attached to said first piston;
  said second point of said second rod being attached to said second piston;
wherein when said brake locking mechanism is in an initial state said cross bar is in a parallel alignment with said first input channel, said first output channel, said second input channel, and said second output channel and whereby said first piston is in a retracted position from said first cavity permitting fluid flow between said first input channel and said first output channel, and said second piston is in a retracted position from said second cavity permitting fluid flow between said second input channel and said second output channel;

wherein when said brake locking mechanism is in an armed state said cross bar is in a perpendicular alignment with said first input channel, said first output channel, said second input channel, and said second output channel and whereby said first piston protrudes into said first cavity disabling fluid flow between said first input channel and said first output channel and said second piston protrudes into said second cavity disabling fluid flow between said second input channel and said second output channel;

a control means;
said control means being in electrical communication with said direct current motor;

whereby said direct current motor is activated in response to receiving a predetermined signal from said control means and if the brake locking mechanism is in an initial state said direct current motor turns said cross bar from said parallel alignment to said perpendicular alignment wherein said direct current motor deactivates pursuant to a stop signal from said first limit switch rendering said brake locking mechanism into an armed state; and whereby said direct current motor is activated in response to receiving a predetermined signal from said control means and if the brake locking mechanism is in an armed state said direct current motor turns said cross bar from said perpendicular alignment to said parallel alignment wherein said direct current motor deactivates pursuant to a stop signal from said second limit switch rendering said brake locking mechanism into an initial state.

8. The brake locking mechanism as in claim 7 wherein said control means comprises an alpha-numeric key pad.

9. The brake locking mechanism as in claim 7 wherein said control means comprises a lock and key system.

10. The brake locking mechanism as in claim 7 wherein said control means comprises a retina and thumb print scanner.

11. The brake locking mechanism as in claim 7 wherein said control means comprises a bar code scanner.

12. The brake locking mechanism as in claim 7 wherein said control means comprises a wireless remote signaling device.

13. A brake locking mechanism for use with a vehicle's hydraulic braking system with means for blocking and unlocking the flow of hydraulic fluid through the existing brake hydraulic system comprising:

a housing;
said housing having an exterior and an interior;
said housing having a first cavity within said interior, a second cavity within said interior, and a third cavity within said interior;

a first input channel, and a second input channel;
said first input channel being in fluid communication with said first cavity and also in fluid communication with a master cylinder of said brake system;

said second input channel being in fluid communication with said second cavity and also in fluid communication with said master cylinder of said brake system;

a first output channel, and a second output channel;
said first output channel being in fluid communication with said first cavity and also in fluid communication with a proportioning valve of said brake system;

said second output channel being in fluid communication with said second cavity and also in fluid communication with said proportioning valve of said brake system;

a direct current motor;
said direct current motor has a shaft;
said shaft rotates in response to operation of said direct current motor;
said direct current motor being attached to said exterior;
said shaft protrudes into said third cavity;

a first limit switch, and a second switch;
said first limit switch being in electrical communication with said direct current motor;
said second limit switch being in electrical communication with said direct current motor;

an oval cam;
said oval cam has a first nadir edge, a second nadir edge, a first zenith edge, and a second zenith edge;
said oval cam is attached to said shaft;
said oval cam being located within said third cavity;

a first hydraulic ball and a second hydraulic ball;
a first spring, and a second spring;
said first spring being located within said first cavity;
said second spring being located within said second cavity wherein when said brake locking mechanism is in an initial state said first hydraulic ball is in contact with said first nadir edge and said first spring keeps said first hydraulic ball out of said first cavity permitting fluid flow between said first input channel and said first output channel, and said second hydraulic ball is in contact with said second nadir edge and said second spring keeps said second hydraulic ball out of said second cavity permitting fluid flow between said second input channel and said second output channel;

whereby when said brake locking mechanism is in an armed state, said first hydraulic ball is in contact with said first zenith edge wherein the bias of said first spring is overcome and said first hydraulic ball protrudes into said first cavity disabling fluid flow between said first input channel and said first output channel and said second hydraulic ball is in contact with said second zenith edge wherein the bias of said second spring is overcome and said second hydraulic ball protrudes into said second cavity disabling fluid flow between said second input channel and said second output channel;

a control means;
said control means being in electrical communication with said direct current motor;

whereby said direct current motor is activated in response to receiving a predetermined signal from said control means and if the brake locking mechanism is in an initial state said direct current motor turns said oval cam until said first hydraulic ball is in contact with said first zenith edge and said second hydraulic ball is in contact with said second zenith edge and wherein said direct current motor deactivates pursuant to a stop signal from said first limit switch rendering said brake locking mechanism into an armed state; and whereby said direct current motor is activated in response to receiving a predetermined signal from said control means and if the brake locking mechanism is in an armed state said direct current motor turns said oval cam until said first hydraulic ball is in contact with said first nadir edge and said second hydraulic ball is in contact with said second nadir edge and wherein said direct current motor deactivates pursuant to a stop signal from said second limit switch rendering said brake locking mechanism into an initial state.

14. The brake locking mechanism as in claim 13 wherein said control means comprises an alpha-numeric key pad.

15. The brake locking mechanism as in claim 13 wherein said control means comprises a lock and key system.

16. The brake locking mechanism as in claim 13 wherein said control means comprises a retina and thumb print scanner.

17. The brake locking mechanism as in claim 13 wherein said control means comprises a bar code scanner.

18. The brake locking mechanism as in claim 13 wherein said control means comprises a wireless remote signaling device.

* * * * *